June 24, 1930. R. D. LEATHERMAN 1,768,085
HEAT CONTROLLER
Filed March 5, 1929
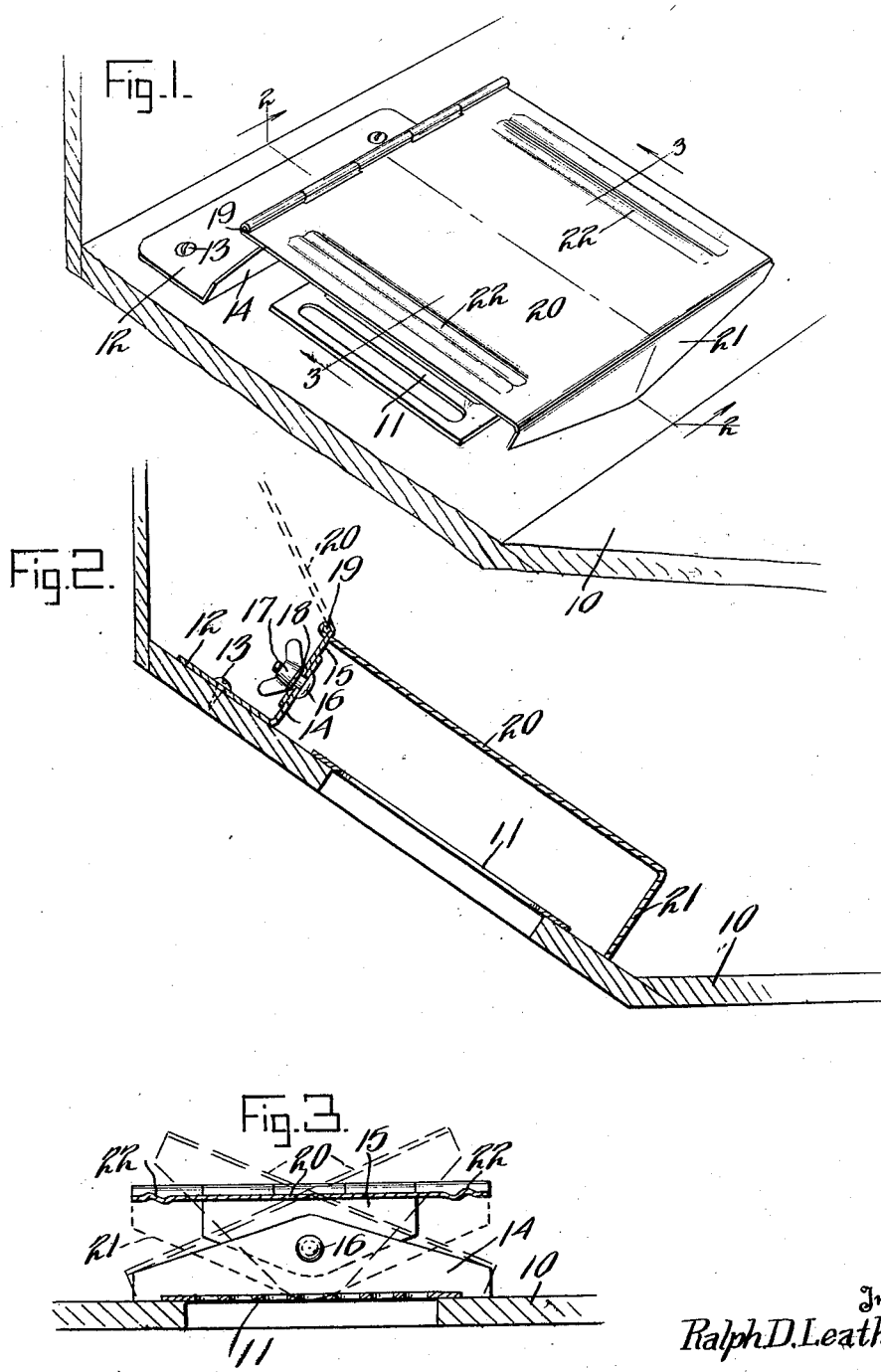
Inventor
Ralph D. Leatherman
By
E. W. Bradford
Attorney Patented June 24, 1930

1,768,085

UNITED STATES PATENT OFFICE

RALPH D. LEATHERMAN, OF TIPTON, INDIANA

HEAT CONTROLLER

Application filed March 5, 1929. Serial No. 344,426.

My invention relates to a device for controlling the direction of the flow of heat issuing from a register of an automobile heater, and it is an object of the invention to provide a strong durable and inexpensive device of this character capable of being adjusted to direct the heat to both sides or to benefit the passenger on either side, and especially to throw the heat directly to the feet of the driver, and one which can be folded back to afford access to the register when the same is not in use, all as will be hereinafter more particularly described and claimed.

Referring to the accompanying drawings, which are made a part hereof and on which similar reference characters indicate similar parts, Figure 1 is a perspective illustrating one application of my invention, Figure 2, a longitudinal section on the line 2—2 of Fig. 1, and Fig. 3, a transverse section on the line 3—3 of Fig. 1.

In the drawings reference character 10 indicates the floor board of an automobile having a register 11 through which heat issues for heating the vehicle, such heat being supplied by any desired type of automobile heater. While I have illustrated the register 11 mounted on the floor board of the vehicle, my device may be used in conjunction with a register mounted in any other desired position on the vehicle, as for example, on the dash. In order to throw the heat in a plurality of directions I provide a heat controller which is adapted to be positioned over the register 11, and which consists of a supporting base 12 adapted to be secured by screws, bolts or other fastening means 13 to the floor board 10, said base having an upright flange 14. The upstanding flange tapers from its ends to its apex as shown, and forms a support for a hinge member 15, pivotally connected thereto by means of a bolt 16 and wing nut 17, a lock washer 18 being also employed for maintaining the parts in fixed relation.

In lieu of the base 12 a base of any other desired form may be used which will conform to the support, or part of the vehicle upon which it is mounted.

The hinge member 15 supports a pivot rod or pintle 19, upon which is mounted a deflector body 20 of substantially square form, having a depending flange 21 at its forward or free end, which corresponds to the end support 15, and which corresponds in shape to the flap of an envelope and forms a support for the free end of the body when it is in horizontal or inclined position for deflecting the heat in the desired direction. The body 20 is provided with deformations in the form of pressed ridges 22 along its side edges which serve to strengthen the body and to add rigidity to the same. The body is also strengthened by the hinge at one end and the flange at the other.

It will also be readily understood that the wing nut may be removed and the body 20 and hinge support 15 may be detached if the same is desired, as for example during warm weather, such removal not requiring the use of any tools, the supporting flange being permitted to remain on the foot board, but may be bent down flat against the same until it is desired to use the device again, whereupon the flange may be bent up to upright position and the body attached thereto.

It will be obvious to those skilled in the art that various changes may be made in my device without departing from the spirit of the invention, and I, therefore, do not limit myself to what is shown in the drawings, and described in the specification, but only as set forth in the appended claims.

Having thus fully described my said invention, what I claim as new and desire to secure by Letters Patent, is:

1. A heat controller for directing the flow of heat issuing from the register of a heater, said deflector comprising a plate of a size to cover the register, means for supporting said plate to permit the same to be tilted at various angles upon an axis parallel to the register, and means for permitting the plate to pivot on an axis transverse to the first axis, whereby the plate may be moved from a position over the register, substantially as set forth.

2. A deflector of heat, comprising a support provided with an upstanding flange, a hinge member pivoted to said flange, and a deflector plate pivoted to said hinge member and swingable transversely of said flange into and out of operative position, substantially as set forth.

3. A device for controlling the direction of the flow of heat issuing from a register comprising a plate having depending flanges at each end, said flanges being tapered from their ends outwardly away from the plate, a support for one of said flanges, a pivot connection between said support and the flanges whereby the plate may be supported in a position parallel to the register, or in an inclined position for deflecting heat to either side of the register, substantially as set forth.

4. A device for controlling the direction of the flow of heat issuing from a register comprising a support adapted to be secured at one side of the register in the plane of the surface of the same, said support having an upstanding supporting flange tapering from its edges to its mid portion, a plate having depending flanges at each end, one of the depending flanges pivotally secured to the plate and adapted to be fixed to said support and the other depending flange adapted to maintain the device in normal position, substantially as set forth.

5. The combination of a register, a deflector plate for controlling the direction of flow of heat issuing from said register having flanges disposed substantially at right angles to its body and tapering from their side extremities to their mid portions, one of said flanges being pivoted to said plate and the plate being mounted over said register, a supporting member having an upright flange pivoted to said pivoted flange and the two opposed flanges permitting the plate to be tilted at the desired heat directing angle, substantially as set forth.

In witness whereof, I have hereunto set my hand at Tipton, Indiana, this 28th day of February, A. D. nineteen hundred and twenty-nine.

RALPH D. LEATHERMAN.